United States Patent [19]

Heger et al.

[11] Patent Number: 5,956,260
[45] Date of Patent: Sep. 21, 1999

[54] ELECTRONIC LEVEL DISPLAYING INCLINATION HAVING DIGITAL AND ANALOG DISPLAYS

[75] Inventors: Charles E. Heger, Saratoga; Paul W. Dodd, San Jose, both of Calif.

[73] Assignee: Zircon Corporation, Campbell, Calif.

[21] Appl. No.: 08/694,718

[22] Filed: Aug. 9, 1996

[51] Int. Cl.[6] .................................................. G01C 9/06
[52] U.S. Cl. .......................... 364/560; 364/559; 33/366; 33/391; 345/23
[58] Field of Search ..................................... 364/560, 559, 364/571; 33/365, 366, 391, 346, 377; 340/689; 345/23–25

[56] References Cited

U.S. PATENT DOCUMENTS

| | | |
|---|---|---|
| 70,547 | 11/1867 | Graham . |
| 743,900 | 11/1903 | Mahan . |
| 928,569 | 7/1909 | Williams . |
| 1,074,969 | 10/1913 | Moore . |
| 1,453,625 | 5/1923 | Johnson . |
| 1,913,919 | 6/1933 | Dion . |
| 2,754,497 | 7/1956 | Wolpert ................................. 340/279 |
| 3,204,233 | 8/1965 | Olliff ..................................... 340/282 |
| 3,233,235 | 2/1966 | Wright ................................... 340/282 |
| 3,289,301 | 12/1966 | Hanson ..................................... 33/93 |
| 3,354,554 | 11/1967 | Panerai et al. ........................... 33/206 |
| 3,378,932 | 4/1968 | Neill ...................................... 33/215 |
| 3,861,052 | 1/1975 | Siegfried ................................ 33/366 |
| 3,945,129 | 3/1976 | Bergkvist ............................... 33/399 |
| 4,349,809 | 9/1982 | Tomes ..................................... 340/52 |
| 4,484,393 | 11/1984 | LaFreniere ............................ 33/348.2 |
| 4,551,921 | 11/1985 | Puyo et al. ............................. 33/366 |
| 4,606,133 | 8/1986 | Mills ..................................... 33/366 |
| 4,641,434 | 2/1987 | Engler ................................... 33/366 |
| 4,684,935 | 8/1987 | Fujisaku et al. ........................ 345/23 |
| 4,686,521 | 8/1987 | Beaven et al. .......................... 345/23 |
| 4,697,174 | 9/1987 | Viator, Sr. .............................. 340/689 |
| 4,716,534 | 12/1987 | Baucom et al. ......................... 364/559 |
| 4,839,833 | 6/1989 | Parkhiskari ............................ 364/562 |
| 4,912,662 | 3/1990 | Butler et al. ........................... 364/559 |
| 4,932,132 | 6/1990 | Baker et al. ............................. 33/366 |

(List continued on next page.)

FOREIGN PATENT DOCUMENTS

| | | | |
|---|---|---|---|
| 0 123 460 | 10/1984 | European Pat. Off. | G01C 9/06 |
| 168 150 | 1/1986 | European Pat. Off. | G01C 9/06 |
| 0 194 087 | 9/1986 | European Pat. Off. | G01C 9/06 |
| 3707 345 | 9/1988 | Germany | G01C 9/12 |
| 40 35 930 | 5/1992 | Germany | G01C 9/06 |
| 58-022910 | 2/1983 | Japan | G01C 9/00 |
| 21413 | 5/1906 | United Kingdom | 33/418 |
| 2 214 643 | 9/1989 | United Kingdom | G01C 9/06 |
| WO 88/00329 | 1/1988 | WIPO | G01C 9/22 |
| WO 88/06273 | 8/1988 | WIPO | G01C 9/06 |
| WO 89/05961 | 6/1989 | WIPO | G01C 9/00 |
| WO 90/11489 | 10/1990 | WIPO | G01C 9/06 |
| WO 91/05985 | 5/1991 | WIPO | G01C 25/00 |
| WO 94/04888 | 3/1994 | WIPO | G01C 9/06 |

OTHER PUBLICATIONS

Zircon Corporation Advertisement (2 pages). Pre–Aug. 1994.
Mayes Selling Card (2 sides). Pre–Aug. 1994.
Inogon Brochure (2 sides). Pre–Aug. 1994.
Wedge Innovations Brochure (2 sides). Pre–Aug. 1994.

*Primary Examiner*—James P. Trammell
*Assistant Examiner*—Bryan Bui
*Attorney, Agent, or Firm*—Skjerven, Morrill, MacPherson, Franklin & Friel LLP; Norman R. Klivans

[57] ABSTRACT

An electronic level includes both a numeric scale and a graphic scale having a "fan-like" configuration of a number of elongated wedge-shaped segments. The inclination of the device is shown numerically using a digital display and, at cardinal angles, graphically by illuminating various segments on either side of a central segment line. The numeric scale provides a numeric indication of the angle of the level from 0° to 360° with respect to a null position, thus satisfying the need to measure absolute angles or slopes. The graphic display provides high resolution at cardinal angles while the numeric display provides lower resolution over 360°.

2 Claims, 9 Drawing Sheets

U.S. PATENT DOCUMENTS

| | | |
|---|---|---|
| 4,976,040 | 12/1990 | Mish et al. |
| 5,031,329 | 7/1991 | Smallidge .................................. 33/366 |
| 5,083,383 | 1/1992 | Heger ......................................... 33/366 |
| 5,121,553 | 6/1992 | Boerder ...................................... 33/640 |
| 5,136,784 | 8/1992 | Marantz ..................................... 33/366 |
| 5,191,713 | 3/1993 | Alger et al. ............................... 33/366 |
| 5,207,004 | 5/1993 | Gruetzmacher ........................... 33/379 |
| 5,259,118 | 11/1993 | Heger ......................................... 33/366 |
| 5,313,713 | 5/1994 | Heger et al. ............................... 33/366 |
| 5,322,441 | 6/1994 | Lewis et al. .............................. 434/307 |
| 5,452,522 | 9/1995 | Kook et al. ................................ 33/451 |
| 5,479,715 | 1/1996 | Schultheis et al. ....................... 364/559 |
| 5,488,779 | 2/1996 | Schultheis et al. ........................ 33/366 |
| 5,592,745 | 1/1997 | Heger et al. ............................... 33/366 |
| 5,594,669 | 1/1997 | Heger ......................................... 364/559 |

ELECTRONIC LEVEL DISPLAYING INCLINATION HAVING DIGITAL AND ANALOG DISPLAYS

BACKGROUND OF THE INVENTION

1. Field of the Invention

This invention relates generally to an electronic level, and specifically to the visual display and calibration of the level.

2. Description of Related Art

Electronic levels known in the art include that sold by Wedge Innovations Inc. and as disclosed in U.S. Pat. No. 4,912,662 issued Mar. 27, 1990 to Butler et al. (assigned to Wedge Innovations Inc.). Such prior art electronic levels display the inclination in degrees or percent slope or by indicator bars, which are typically not the inclination measurements used by building tradesmen or others. Other devices provide more easily interpreted graphic displays that provide excellent resolution at cardinal angles, such as level or plumb. However, electronic levels of the prior art do not provide both an indication of absolute angles and a high-resolution intuitive graphic display.

SUMMARY

An electronic level includes both a numeric (digital-type) scale and a graphic (analog-type) display, both of which are simultaneously active to indicate inclination when the level is in use. The numeric display measures absolute angles or slope in degrees; the graphical display is easier to interpret and use, particularly at cardinal angles such as level or plumb, and provides a more precise (finer) measure of inclination than does the numeric display.

The numeric display provides a numeric indication of the angle of the level with respect to a null position, thus satisfying the need to measure absolute angles or slopes. A novel display processor provides a linearized signal for the numeric display. The display driver provides a high degree of precision using relatively simple circuitry.

The graphic display includes a number of illuminated nonparallel and adjacent display segments, each segment being of an extended wedge shape and representing a predetermined increment of inclination. The segments are arranged at a sequence of angles relative to a longitudinal axis of a housing of the level. The segments therefore define a fan-like configuration extending on both sides of the longitudinal axis. For any one particular degree of inclination (except at a null position), segments on both sides of the axis are illuminated as in the central (null position) segment to provide a symbolic reference to the longitudinal axis of the level and hence indicate the degree of inclination. If the level device is at a null position (level or plumb) only the central segment is illuminated. In another embodiment the central segment is illuminated only at a null position of the level, thus emphatically indicating level or plumb.

DETAILED DESCRIPTION OF THE INVENTION

The level disclosed herein includes improvements over the level disclosed in commonly owned U.S. Pat. No. 5,479,715, entitled "Electronic Level Displaying Inclination Using a Multi-Segment Fan-Like Display," which issued Jan. 2, 1996 to Gary R. Schultheis and Charles E. Heger. Also, certain features of the levels disclosed in commonly owned U.S. Pat. No. 5,083,383 entitled "Electronic Capacitance Level With Automatic Electrode Selection," which issued Jan. 28, 1992 to Charles E. Heger, and in commonly owned U.S. Pat. No. 5,259,118 entitled "Electronic Level With Display . . . " which issued Jan. 28, 1992 to Charles E. Heger. In addition, a capacitive sensing system in accordance with the present invention is described in U.S. Pat. No. 5,083,383 and therefore is not further described here. Also, the present level has many common features to that disclosed in U.S. Pat. No. 5,713,313. Each of the aforementioned patents is incorporated herein by reference.

Display

Figure 1A:
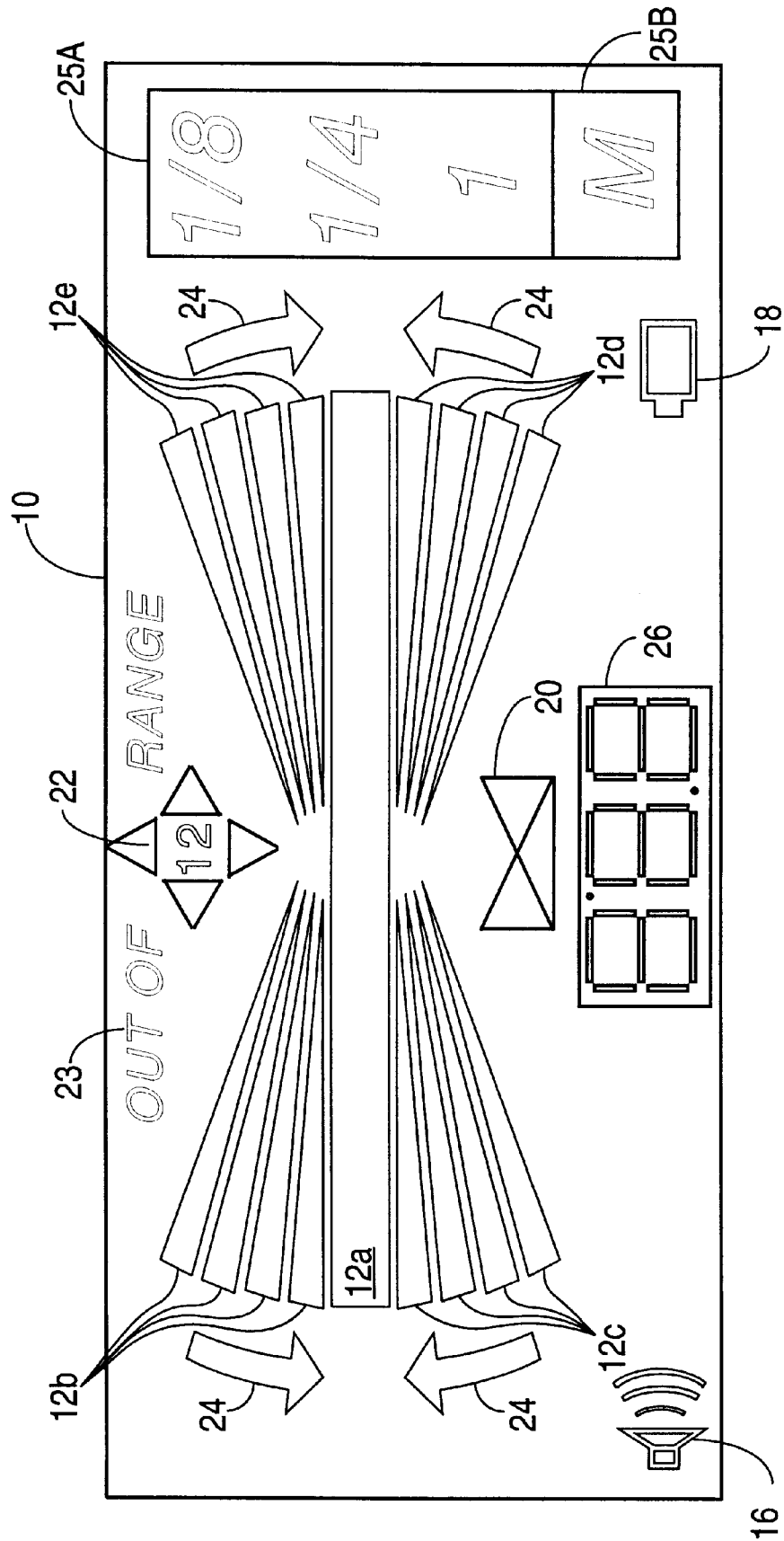
FIGS. 1A, 1B, 1C, 1D, show level displays in accordance with the invention.

FIG. 1A shows all of the segments of display 10 of the level in accordance with the invention. It is to be understood that display 10 is conventionally mounted on a convenient outer surface of the level housing, the mechanical structure of which is typical of that used in electronic levels commercially available from, for instance, Wedge Innovations and Zircon Corporation.

Display 10 includes a central level (or plumb) indicator segment 12a and a plurality of inclination indicator segments arranged in a fan-like configuration on either side of central segment 12a. In this embodiment, there are four inclination segments in each group 12b, 12c, 12d, 12e. The segments in groups 12b, 12d operate in conjunction (as described below), as do the segments in groups 12c and 12e. Thus while sixteen inclination indicator segments are shown in FIG. 1A, these comprise only eight actual inclination indicators. It is to be understood that in another embodiment only the segments in e.g. groups 12b, 12c (to the left-hand portion of display 10) are present; the other two groups 12e, 12d are thus functionally redundant but provide additional visual emphasis.

Also included on display 10 are a conventional beeper (loudspeaker) volume icon 16, a low battery icon 18, a calibration icon 22 that includes four small triangles and two numerals, an out-of-range icon 23, directional arrows 24 that indicate the direction that level 27 must be rotated to approach the nearest cardinal angle (e.g., 0°, 90°, 180°, and 270°), a fractional display 25A, a memorized-angle indicator 25B, and a numeric display 26. The operation of the icons of display 10 is described below.

Graphic Display Operation

Figure 1B:
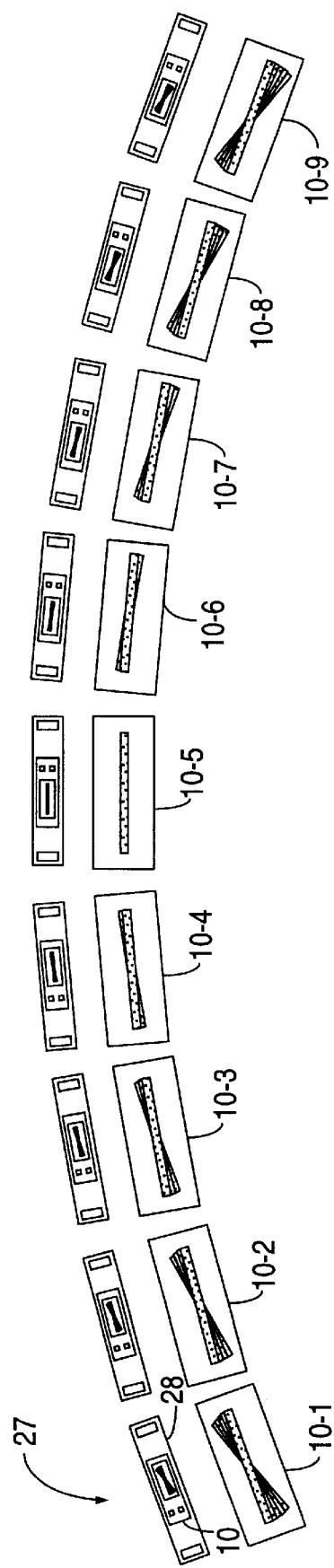

FIG. 1B illustrates the function of the graphic display of level 27. FIG. 1B shows, in the upper row, a plurality of positions of a level 27, where level 27 includes the display 10 mounted on a conventional level housing 28. (It is to be understood that level 27 is shown here only diagrammatically, and that the amount of inclination is exaggerated in FIG. 1B.) FIG. 1B shows level 27 in nine positions relative to the direction of the earth's gravitational field, with the central position being the level position and the other positions on either side of the level position being varying degrees of inclination. Immediately below each depiction of level 27 is the corresponding appearance of the graphical portion of display 10, showing the fan-like configuration of the central and inclination segments 12a, 12b, 12c, 12d, 12e (not labeled in FIG. 1B).

As shown in the central position of level 27, the corresponding display 10-5 has only the central segment 12a illuminated. The furthest degree of inclination is shown in displays 10-1 and 10-9. Thus in display 10-1 level 27 is rotated in the counterclockwise direction, and display 10-9 correspondingly shows level 27 rotated in the clockwise direction about a central vertical axis. The other displays 10-2, 10-3, 10-4, and 10-6, 10-7, 10-8 show intermediate degrees of inclination. It can be seen that this readily provides an intuitive graphical indication of the amount of inclination of the level. In one embodiment, the graphic display has range of ±18 arc minutes and a resolution of 2.4 arc minutes about a null or calibration point, resulting in high sensitivity for achieving level, plumb, or some arbitrary (e.g., user-selected) angle.

Figure 1C:
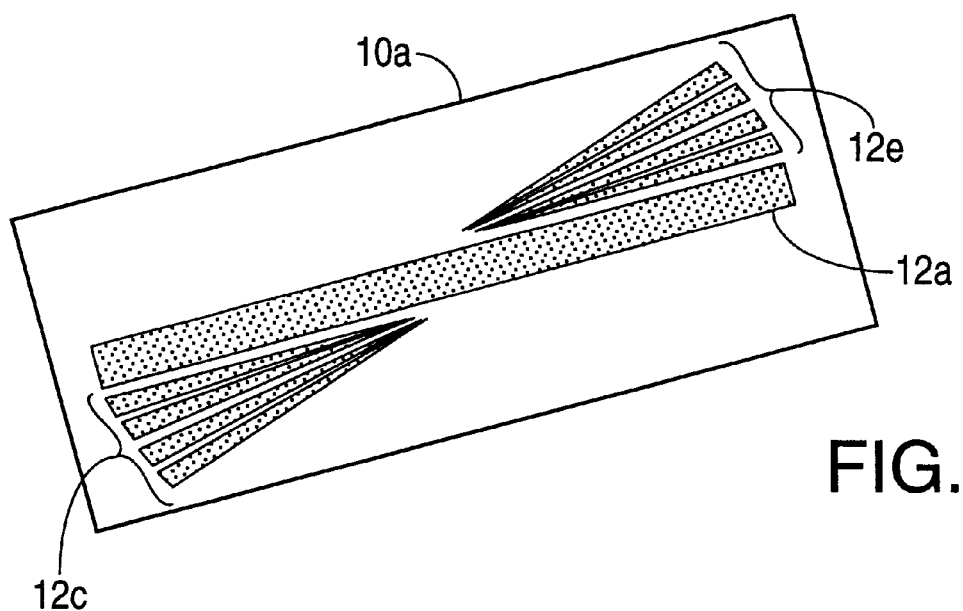

FIG. 1C shows detail of display 10, here designated 10a, corresponding to the analog display of display 10-1 of FIG. 1B, at the maximum inclination with each segment in groups 12c, 12e and central segment 12a illuminated.

Figure 1D:
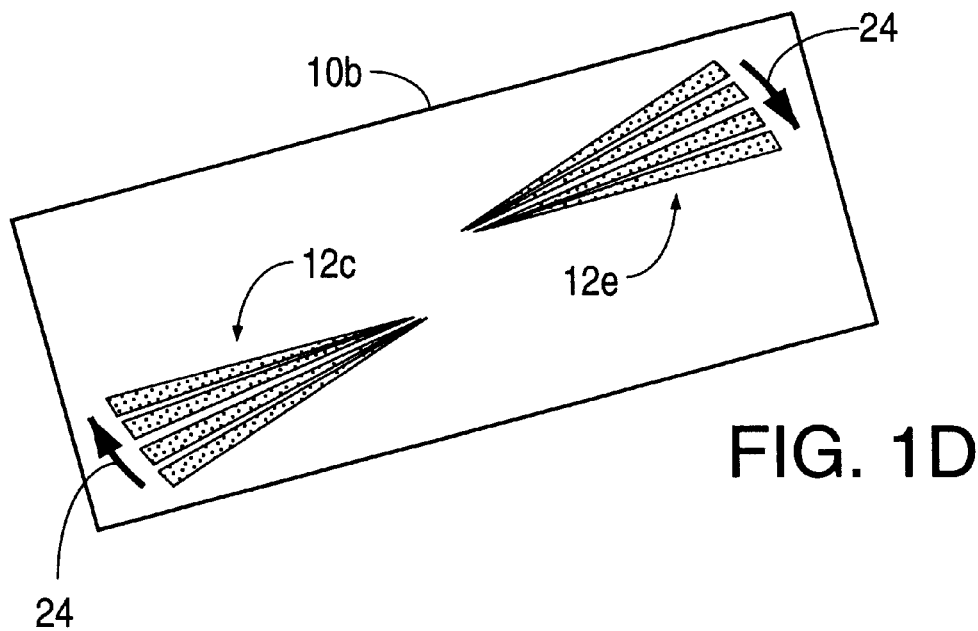

Another embodiment is shown in FIG. 1D with the central segment 12a absent from display 10b. It can be seen that in this case the display 10b still provides an easily understood indication of the deviation from the level position, even without the presence of the central segment 12a. In this case the level position is shown by the illumination of only the central segment 12a. Also illustrated in this embodiment are direction of rotation arrows 24 indicating (as in U.S. Pat. No. 5,713,313) in which direction the level is to be rotated to achieve level (or plumb).

It is to be understood that the central segment 12a and the inclination segments 12b, 12c, 12d, 12e (as well as the other elements of display 10) may be provided by any type of display such as an LCD display, an LED display, or illuminated segments using other forms of illumination. In the context of the present application, "illuminated" refers to the presence of the displayed object (the segment being "on"); thus in the case of an LCD display as shown here, the "illuminated" portion is actually darker (as shown in FIG. 1C) than are the "non-illuminated" portions.

Also provided (FIG. 1A) is an out-of-calibration indicator 22 (including a calibration step indicator) that, by illuminating out-of-range icon 23 and one or more of the four triangles incorporated therein, indicates that the device has invalid calibration at that particular inclination and hence that valid information cannot be displayed. Also, indicator 22 includes the numerals "1" and "2" for indicating the first and second calibration steps as in U.S. Pat. No. 5,713,313, incorporated herein by reference. In one embodiment all the inclination segments 12b, 12c, 12d, 12e indicate a maximum indication of deviation from null of e.g. only ⅛ of an inch per linear foot.

Loudspeaker icon 16 conventionally indicates activation of the tone generator, and fractional display 25A indicates slope in inches per linear foot.

The above-described visual indications provided by the graphic display may be provided by a number of different electronic circuitry arrangements, one of which is described hereinafter.

Circuitry

The following description of electronic circuitry is of one embodiment of the invention and provides a rapidly responding visual display and tone processing, with accurate indication of inclination. A combination of an application specific integrated circuit (ASIC), including logic circuitry, and a programmed microcontroller is utilized for the electronic portions of the level in one embodiment, a block diagram of this combination is shown in FIG. 2. It is to be understood that one of ordinary skill in the art could code the microcontroller computer program in light of the detailed operating steps described hereinafter.

The four exponential R-C timing signals from the sensor 34 electrodes A to D are processed by respectively conventional comparators U1, U2, U3, U4 (as described in U.S. Pat. No. 5,083,383), utilizing an automatic electrode selection technique. The reference voltage for each pair of diagonally opposed comparators U1, . . . , U4 is derived from two digital-to-analog converters (DAC's) 38, 40 with sensor comparators U1 and U3 driven by a 9 bit DAC 38 called FDAC (fine DAC) and electrode comparators U2 and U4 driven by an 8 bit DAC 40 called CDAC (coarse DAC). Each DAC 38, 40 receives its digital data input from a latch circuit respectively 68, 70 for retaining the digital data, and whose outputs are connected to an R-2R DAC resistor network to derive the analog voltage.

The output signals from comparators U1, U2, U3 and U4 associated respectively with sensor quadrants (electrodes) A, B, C, D are provided to sensor decoder logic (DEC) circuitry 36. This performs the octant decoding function as described below. Decoder circuitry 36 provides two outputs; the single bit "early/late" clock signal ("Early") and the 3 bit octant indicator ("Oct"), N averager 54 averages as described below the sensed inclination Early signal over N time periods. Averager 54 provides two output signals; one is a "Data" signal indicating the averaged inclination value as an 1 bit value, and a Clock signal. Both the Data signal and Clock signal are provided to the moving average filter circuitry 56 described in detail below. The output signal of the moving average filter 56 is a 5 bit value FN provided to display logic 58.

Figure 2A:
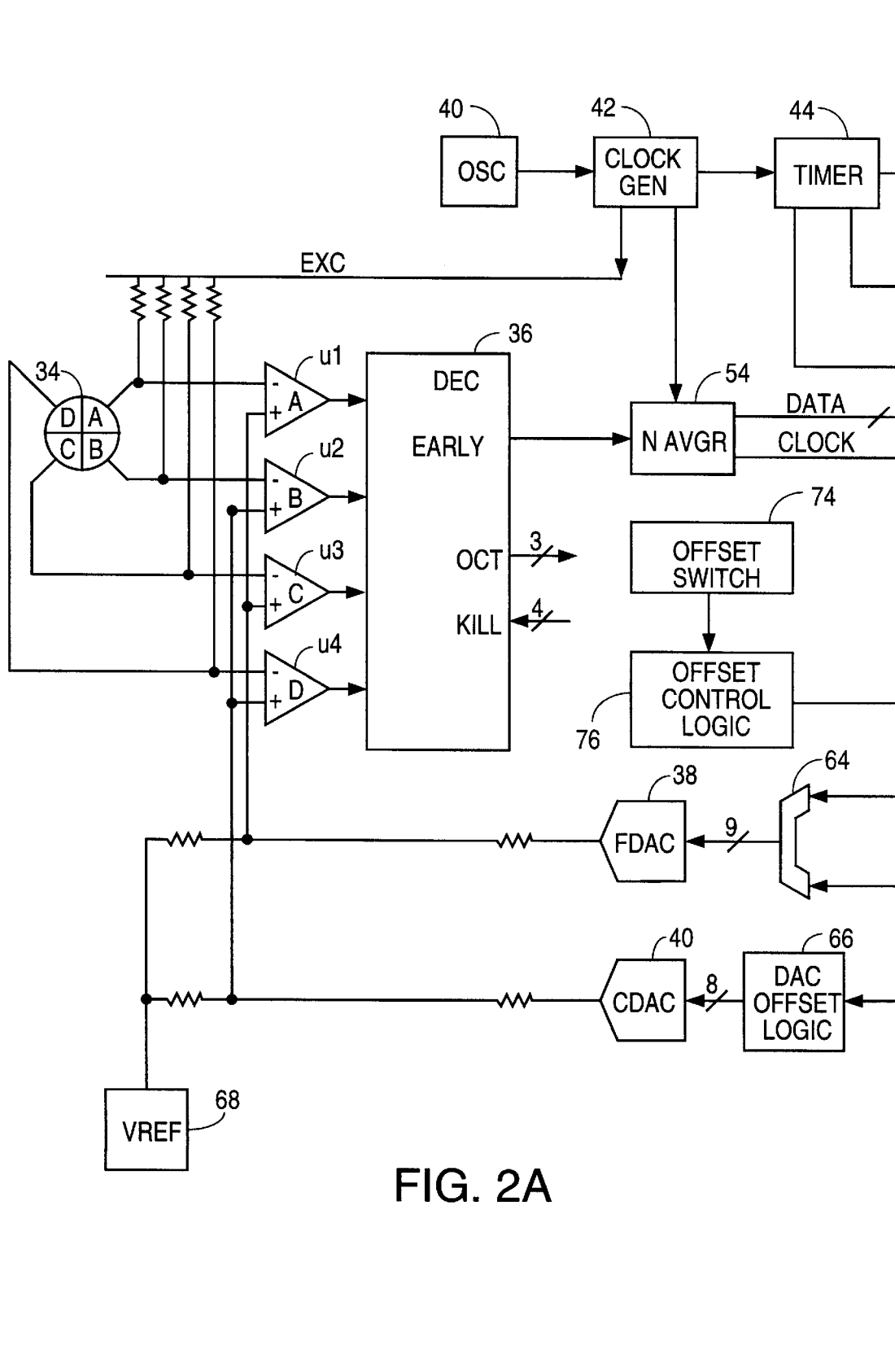
FIG. 2 shows a block diagram of circuitry in accordance with the invention.
Figure 2B:
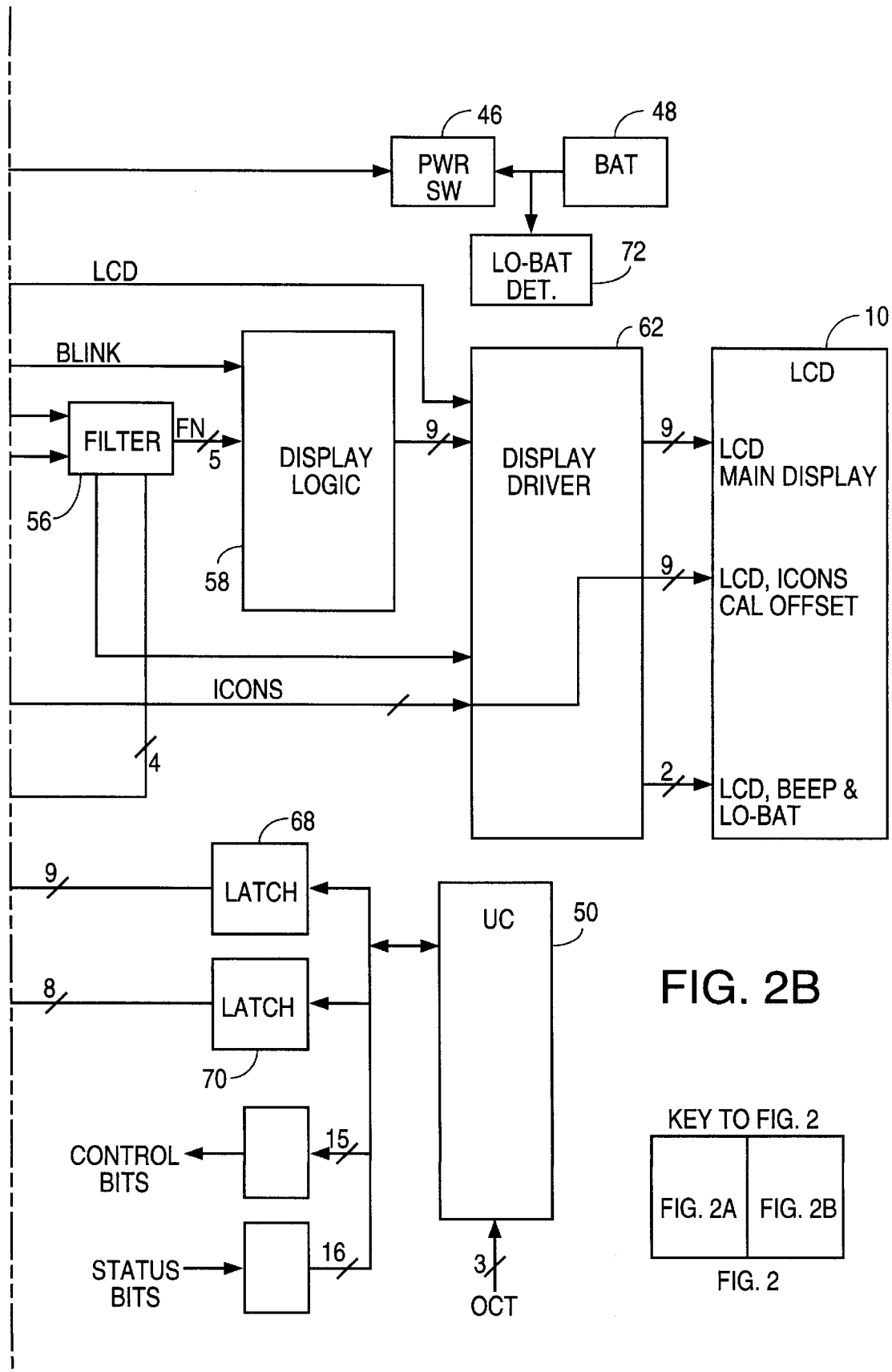

Shown at the top portion of FIG. 2B is conventional battery 48 connected via a power switch 46 to provide power. A conventional low-battery-detection circuit 72 is connected to battery 48. Also shown is conventional oscillator 41 that drives a clock generator 42, which in turn drives a timer circuit 44 that provides timing for the LCD display driver circuitry 62 (signal "LCD") and also a "Blink" signal that is the timing signal for the display logic 58. Clock generator 42 also provides the excitation signal on line EXC to four resistors for providing the excitation voltage to each of the sensor electrodes A, B, C, and D. The timer 44 is also connected to the power switch 46 to turn the power off if the level is inactive for a particular amount of time.

Display logic 58 provides the display/tone processing functions described below and drives (via a 9 bit bus) the conventional display driver circuitry 62. The display driver circuitry 62 also receives the "icons" multi-bit input signal from the offset control logic 76, the beep control signal, the low battery detector signal, and an output signal FN from the filter 56. The 5 bit filter 56 signal FN can have 32 states. Seventeen of these states are used and encoded into nine segments of display 10 using a weighting process, disclosed below.

The conventional LCD 10 includes the "LCD" main display fan-like display segments 12a, 12b, 12c, 12d, 12e. The LCD 10 also includes the "LCD Icons" segments as described above for calibration ("Cal"), for the user/fixed offset modes ("Offset") and other segments for the "Beep" (loudspeaker) and low battery ("LO-BAT") indications as shown in FIG. 2.

The lower portion of FIG. 2B shows a conventional 8-bit microcontroller 50 connected conventionally by a bidirectional serial I/O circuit (not shown) to latches 68 and 70. Latch 68 is connected (via adder 64, which adds the output of latch 68 to the output of filter 56) to FDAC 38. Similarly, latch 70 is connected via DAC offset logic 66 (the operation of which is described in U.S. Pat. No. 5,479,715) via an 8 bit bus to CDAC 40.

The FDAC 38 and CDAC 40 drive respectively (via a four-resistor network) the positive input terminals of respectively comparators U1 and U3 and comparators U2 and U4. Voltage reference 68 supplies a reference voltage equal to one-half the system supply. Both the CDAC and FDAC can, via the resistor network, slightly modify the inverting (minus) input terminal voltages to the comparators.

The 15 control bits from microcontroller 50 perform the functions of enabling/disabling the display calibration icon 22 and associated numerals 1 and 2 (i.e., the "Icons" signal input to the display driver circuitry), and provide the sensor "KILL" signal for a user offset mode (described below). The 16 status bits input to microcontroller 50 provide an indication so the microcontroller can monitor functions including the calibration process, the Early signal, and the averager output signal.

Averaging

The output of the sensor decoder logic circuitry 36 will be a binary "1" or "0" after the sensor excitation pulse provided on line EXC, depending upon the orientation of sensor 34.

To help remove system noise, the result of a number of excitation pulses are averaged by averager 54. In one version the number of cycles N averaged is 64, with the following criteria: if the number of accumulated "1"'s is less than 16 over a 64 cycle period, the averaged data is a "0"; if the number of accumulated "1"'s is greater than 48 then the average data is a "1"; if the number of accumulated "1"'s is between 16 and 48 then the previous averaged data result will be used. This allows a 50% "noise band" to exist suppressing small physical (motional) and system noise.

Averaging Calibration

In normal mode operation (indicate level/plumb), the CDAC 40 digital value is fixed at half scale by microcontroller 50 of FIG. 2 by writing the value 80 hex into the CDAC latch 70. During user calibration for any given axis (Level, Plumb, etc.) the FDAC 38 is cycled by microcontroller 50 in a successive approximation routine (SAR) starting with the most significant bit (MSB) and the 9-bit result is temporarily stored by the microcontroller 50. The level is then rotated 180° in the plane of the current working surface by the user and the FDAC 38 is again cycled through the SAR and the result temporarily stored. These two temporary results are then averaged via a conventional math routine in the microcontroller 50 to ascertain their mean value. This mean value is then conventionally stored in non-volatile memory associated with microcontroller 50 (not shown) and becomes the calibration word (value) for the particular axis calibrated. This routine is repeated for each of the four primary axes of the level.

The calibration arrows (triangles) of icon 22 of FIG. 1A indicate each axis calibration status:

solid on: not calibrated
blinking: calibration in process
off: calibrated

In addition to the calibration arrows, a numeral 1 or 2 in icon 22 is displayed during the calibration cycle to alert the user to the calibration step in process i.e.:

"1": first cal step
"2": second cal step

After the calibration cycle for any axis is complete, both numerals 1 and 2 of icon 22 are extinguished.

Octant Decoding

The output signals of the four sensor comparators U1, U2, U3, U4 are decoded by decoder logic 36 to sense the octant within which the sensor 34 is currently oriented. (An example of this decoding is shown in FIGS. 4A and 4B(1) and 4B(2) of U.S. Pat. No. 5,713,313.) Decoding is accomplished by sensing the timing relationships of the four sensor 34 electrodes A, B, C, D. There are eight decoded "zones," each zone being 90° with four zones being in quadrature (45° shifted) from the other four zones. The eight decoded octants are uniquely represented on a three-bit bus from output terminals OCT of decoder circuitry 36. The eight octants are discuss in detail in connection with FIGS. 3–5.

Display/Tone Processing

Control of the inclination display and available tones is by display logic circuitry 58. After a successful calibration cycle and storage of the calibration word for any particular quadrant, the following sequence occurs:

Initially one starts with the eight bit calibration word from the microcontroller 50, and a value of binary 1000 (8 hex) is added to the calibration word, which represents a "level" display and tone, and the sum of these two values is added in adder 64 resulting in the FDAC binary word (value) sent to the FDAC 38. A value of binary 10 (2 hex) is now added to the FDAC word by the filter 56. Three possible results from these two readings may occur:

1) If the result out of the averager 54 of these two successive data bits is 01, no change in the display/tone occurs and the FDAC word is decremented by 10 binary;
2) If the result is 00, the display is incremented by one segment to the right and the FDAC word incremented by 10 binary; and
3) If the result is 11 the display is decremented by one segment and the FDAC word decremented by 10 binary.

This process continues indefinitely, continuously updating the display and tracking the 0/1 null with two successive data pairs of data results. If the FDAC word reaches either ±8 decimal away from the calibrated "level" FDAC word, the FDAC word is not incremented (decremented) any more until the data comes back into a ±8 decimal range of the FDAC calibration word. Each 2 bit wide "bin" of the FDAC word about a ±16 bit range of the calibration word corresponds to a display segment and tone frequency in one embodiment.

Assume that the physical position of the sensor 34 was such that the change in data from a 0 to a 1 occurs when the FDAC word equals the calibration word plus 1000 binary. When the FDAC word is then less than the calibrated word, the averaged data is a 0 until the FDAC word equals the calibration word. Thereafter the averaged data is a 1. This corresponds to a "level" condition and all 8 inclination segments on either side of the central segment would be unilluminated, with only the center level segment illuminated, indicating "level."

If the sensor 34 were now slightly rotated counter-clockwise (CCW), the change in data from a 0 to a 1 would occur earlier in the 16 bin FDAC cycle, and those inclination segments 12c, 12e corresponding to the FDAC bins where data was a 1 would be illuminated. If the sensor 34 was significantly rotated CCW from the "level" position (assuming that the quadrant has not changed) all four display segments in each of groups 12c, 12e would be illuminated. Therefore, nine unique states exist within each quadrant that describe the position of the sensor 34 relative to "level".

In addition, each unique display state is associated with a certain tone from tone generator 60 for audible user feedback, with the exception that when all of the either four right hand or left hand inclination segments indicating maximum inclination are on (illuminated), no tone output occurs. The same set of tone frequencies is used for inclination bars 12b, 12d and for 12c, 12e. (In another embodiment, the tone is provided only for level or plumb; in yet another embodiment, one tone indicates level/plumb and another not level/plumb.)

All four primary quadrants of inclination are similarly treated, with the exception that the averaged data polarity is reversed in the plumb and inverted plumb quadrants. This polarity change is due to the physical relationship of pairs of sensor 34 electrodes A, B, C, D. For example, in the Level quadrant, electrodes B and C are active with B being on the right. But in the plumb quadrant, electrodes A and B are used with B now being on the left. This change from right to left changes the polarity of the resulting data.

Operational Modes

A level in accordance with the present inventions supports various modes, such as a user-offset mode that allows the user to set a "level" display (null) condition anywhere within 360°. This and other aspects of a level in accordance with the present invention are described in U.S. Pat. No. 5,479,715. For user reference, memorized-angle indicator 25B is illuminated when an arbitrary angle is memorized in the user-offset mode.

Numeric Display Operation

In accordance with the present invention, numeric display 26 is included in display 10 to satisfy the need for a level that can measure absolute angles in addition to cardinal angles. In one embodiment, numeric display 26 has a range of 360° and a resolution of 0.50°, thus being less precise than is the graphic display described above. It is to be understood that numeric angle indications may be provided by a number of different electronic circuitry arrangements, some of which are conventional. The circuitry arrangement described below provides numeric angle indications over the full 360° range using relatively simple, and therefore cost-effective, circuitry.

Figure 3:
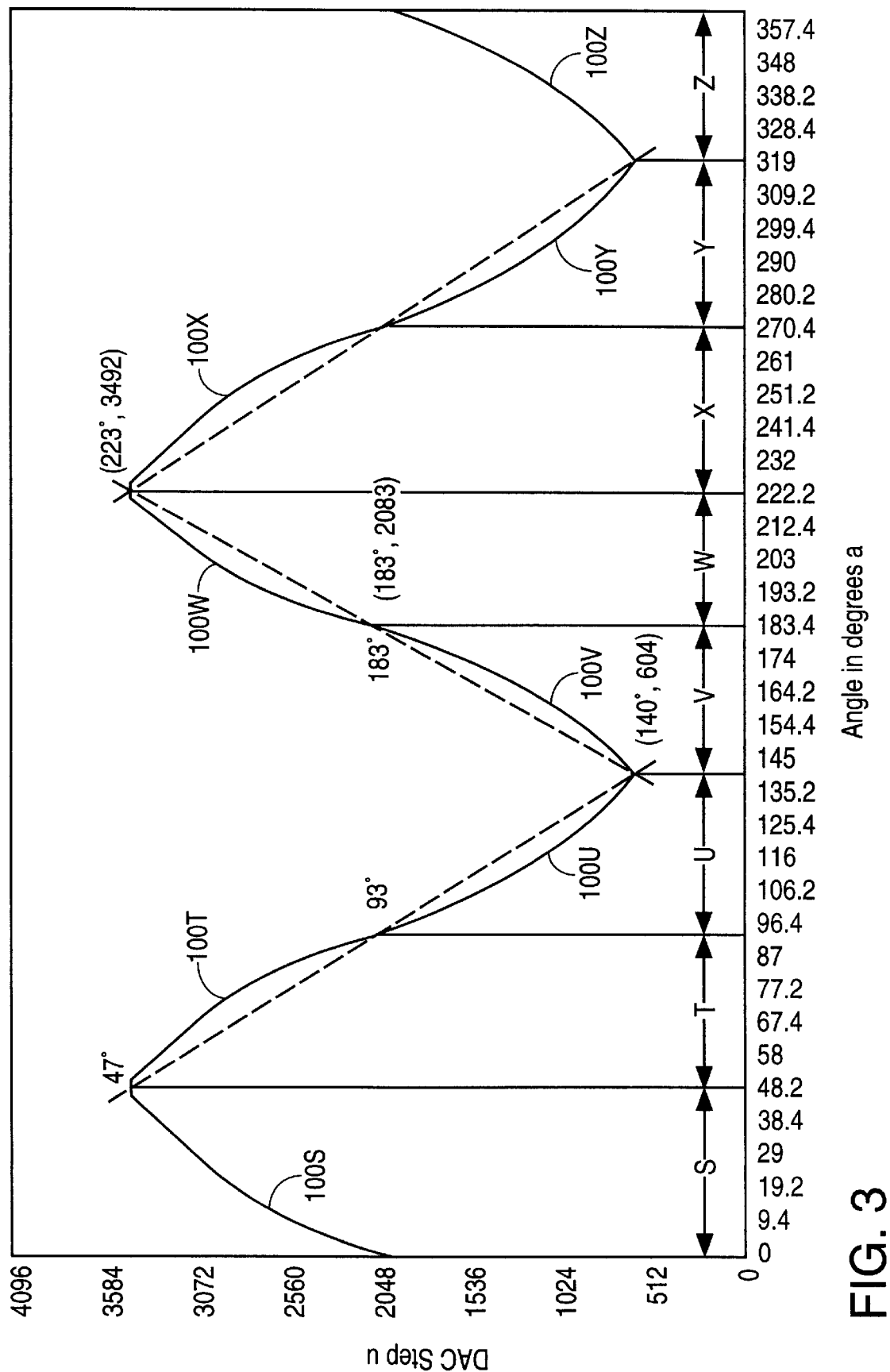
FIG. 3 is an empirically derived graph of DAC steps (vertical axis u) versus sensor angle (horizontal axis a) taken using a level configured in accordance with the present invention.
Figure 4A:
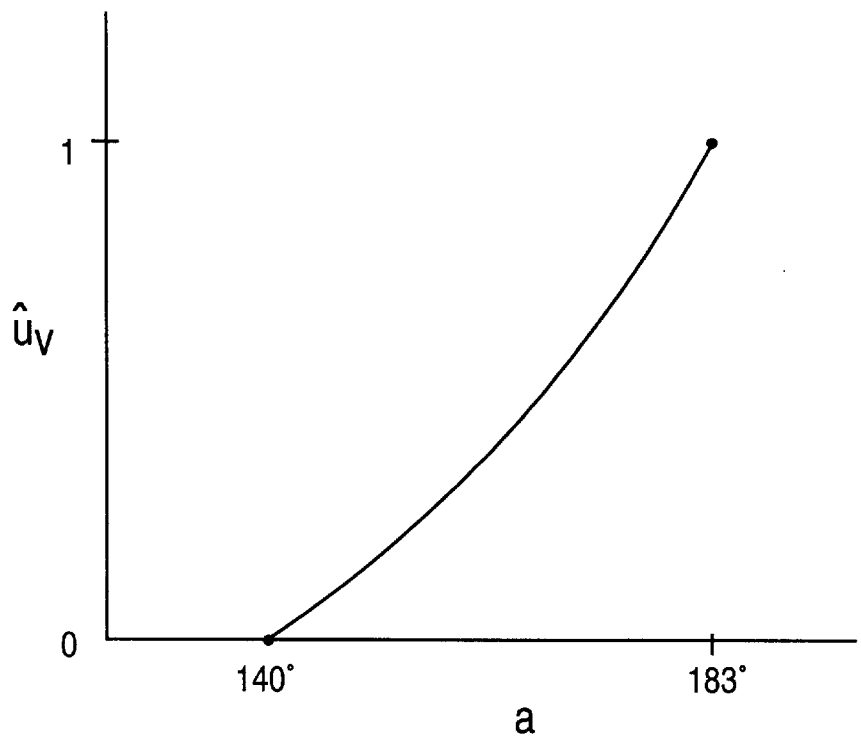
FIG. 4A is a graph of $\hat{u}_V$ versus a (for true angle).
Figure 4B:
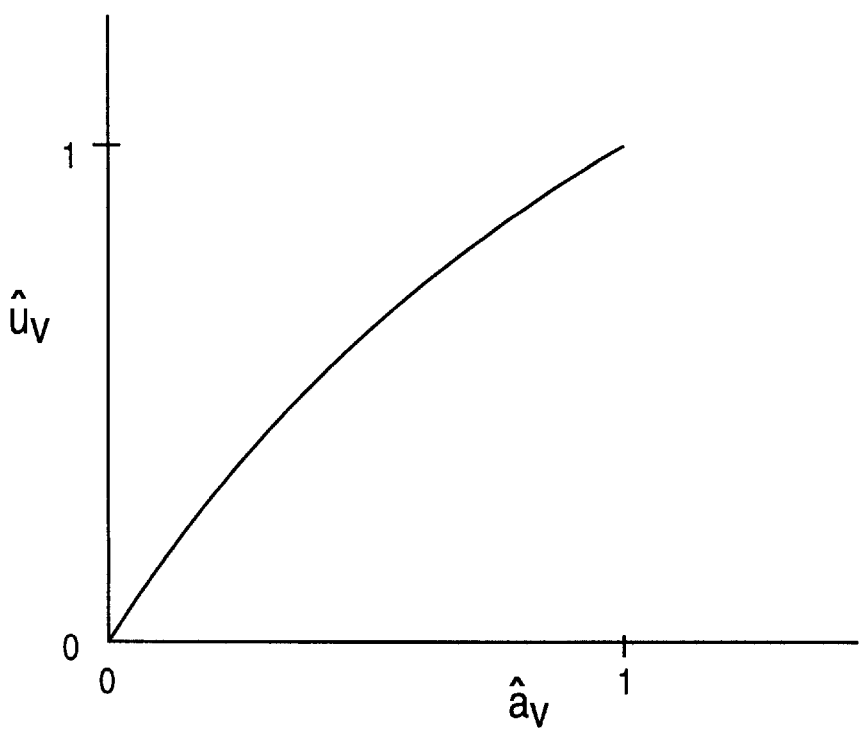
FIG. 4B is a graph of the normalized value $\hat{u}_V$ versus the normalized angle $\hat{a}_V$ for segment 100V.

FIG. 3 is an empirically derived graph of DAC steps (vertical axis u) versus sensor angle (horizontal axis a) taken using a level configured in accordance with the present invention. A line 100 (divided into line segments 100S–100Z) represents the number of DAC steps of FDAC 38 of FIG. 2A; the number of DAC steps of CDAC 40 is assumed constant. The data represented by line 100, modified as described below, is used to drive digital display 26.

Line 100 is divided into eight segments, or octants, S through Z. Each of octants S–Z represents approximately 45° of rotation of level 27. Unfortunately, as the empirically derived data of FIG. 3 shows, octants S–Z do not accurately span 45°. For example, the data indicates that octant T spans 46° (47° to 93°), octant U 47°, and octant V 43°. Because of this nonlinearity, driving numeric display 26 with the data represented by line 100 provides relatively inaccurate angle measurements. Accordingly, level 27 includes circuitry calibrated to compensate for the nonlinearity of line 100.

One means of compensating for the nonlinearity of line 100 is to provide a look-up table (LUT) that accepts the data of line 100 as input and provides in response a compensated signal to display 26. For example, the DAC step corresponding to 47° may be stored so that when the LUT is prompted with that DAC step the LUT outputs the correct signal level corresponding to 47°. However, such an implementation is cumbersome, as it would require a LUT large enough to store the appropriate angular data for each possible angle of interest. In a level that measures in half degrees, such a LUT would require at least 720 (360×2) entries, and each of those entries would have to be empirically derived to calibrate each level manufactured.

In accordance with one embodiment of the invention, the size of the LUT required to provide linear output signals for each possible DAC step is reduced by a factor of eight. To accomplish this reduction, each of line segments 100S–100Z is normalized to extend in both axes from zero to one, where one corresponds to the extremum DAC step value and zero corresponds to a point on line 100 at which a straight line (dotted lines of FIG. 3) between extremum DAC values intersects line 100. For example, line segment 100V is normalized such that the zero point corresponds to the point [183°, 2083] and one point corresponds to the point [140°, 604], and line segment 100W is normalized such that the zero point corresponds to the point [183°, 2083] and the one point corresponds to the point [140°, 3492].

Applicants discovered that the curvature of the normalized segments is the same for each of line segments 100S–100Z. Applicants further discovered that, due to the similarity of the normalized curves, a single LUT describing the curvature of any one normalized curve (or an average of a number of normalized curves) may be used for each of octants S–V. That is, data relating DAC steps to angle need only be supplied for a range of 45° (a single octal) as opposed to 360°. Consequently, the LUT required to measure all angles from 0° to 360° is reduced by a factor of eight.

The following describes the procedure for normalizing line segment 100V. Line segments 100S–100U and 100W–100Z are normalized in the same manner; accordingly, a description of the processes of normalizing those segments is omitted for brevity.

FIG. 3 shows that line segment 100V extends from 604 DAC steps to 2,083 DAC steps along the vertical axis u, which is shown to correspond with true angles of from 140° to 183°. Normalizing the vertical axis u to extend from zero to one, the normalized value $\hat{u}_V$ for line segment 100V may be expressed as:

$$\hat{u}_V = G_{hd} uv(u + \text{Off}_{uv}) \qquad [1]$$

where $G_{uv}$ and $\text{Off}_{uv}$ are the respective DAC gain and DAC offset associated with octant V. Solving for $G_{uv}$ and $\text{Off}_{uv}$ using 604 DAC steps and 2,083 DAC steps provides:

$$\hat{u}_V = 1/1479(u_{Vb} - 604) \qquad [2]$$

Thus, $G_{uv} = 1/1479$ and $\text{Off}_{uv} = 604$. FIG. 4A is a graph of $\hat{u}_V$ versus a (true angle). Normalized value $\hat{u}_V$ is unitless.

The horizontal axis a of segment 100V is also normalized to extend from zero to one. The normalized angle $\hat{a}_V$ for segment 100V may be expressed as:

$$\hat{a}_V = G_{av}(a_V + \text{Off}_{av}) \qquad [3]$$

where $G_{av}$ and $\text{Off}_{av}$ are the respective angular gain and angular offset associated with octant V. Rearranging equation [3] and solving for $a_V$:

$$a_V = 1/G_{av} \hat{a}_V - \text{Off}_{av} \qquad [4]$$

Solving for $G_{av}$ and $Off_{av}$ using the angles 140° and 183° provides:

$$a_V = -43\hat{a}_V + 183° \quad [5]$$

Thus, $1/G_{av}=-43$ and $(-Off_{av})=183°$, so that $G_{av}=-1/43$ and $Off_{av}=-183°$.

As part of the calibration process for level 27, gain and offset values similar to $G_{uv}$, $Off_{uv}$, $G_{av}$, and $Off_{av}$ derived above are derived for each of octants S–Z. These gain and offset values—four for each octant—are then stored in RAM (not shown) resident in microcontroller 50.

FIG. 4B is a graph of the normalized value $\hat{u}_V$ versus the normalized angle $\hat{a}_V$ for segment 100V. The curve of FIG. 4B curves in the opposite direction of the curve of FIG. 4A because line segment 100V is normalized so that the vertical axis is inverted. Every other of line segments 100S–100Z is similarly inverted when normalized so that the resulting normalized curves all curve in the same direction (i.e., all of the normalized curves are similar to the curve of FIG. 4B).

As discussed above, the normalized curves associated with each of line segments 100S–100Z are nearly identical. Thus, the normalized curve depicted in FIG. 4B for segment 100V is substantially identical to similarly derived curves associated with the other line segments. As a result, a single mathematical relationship may be used to calculate true angles within each of octants S–Z.

Figure 5:
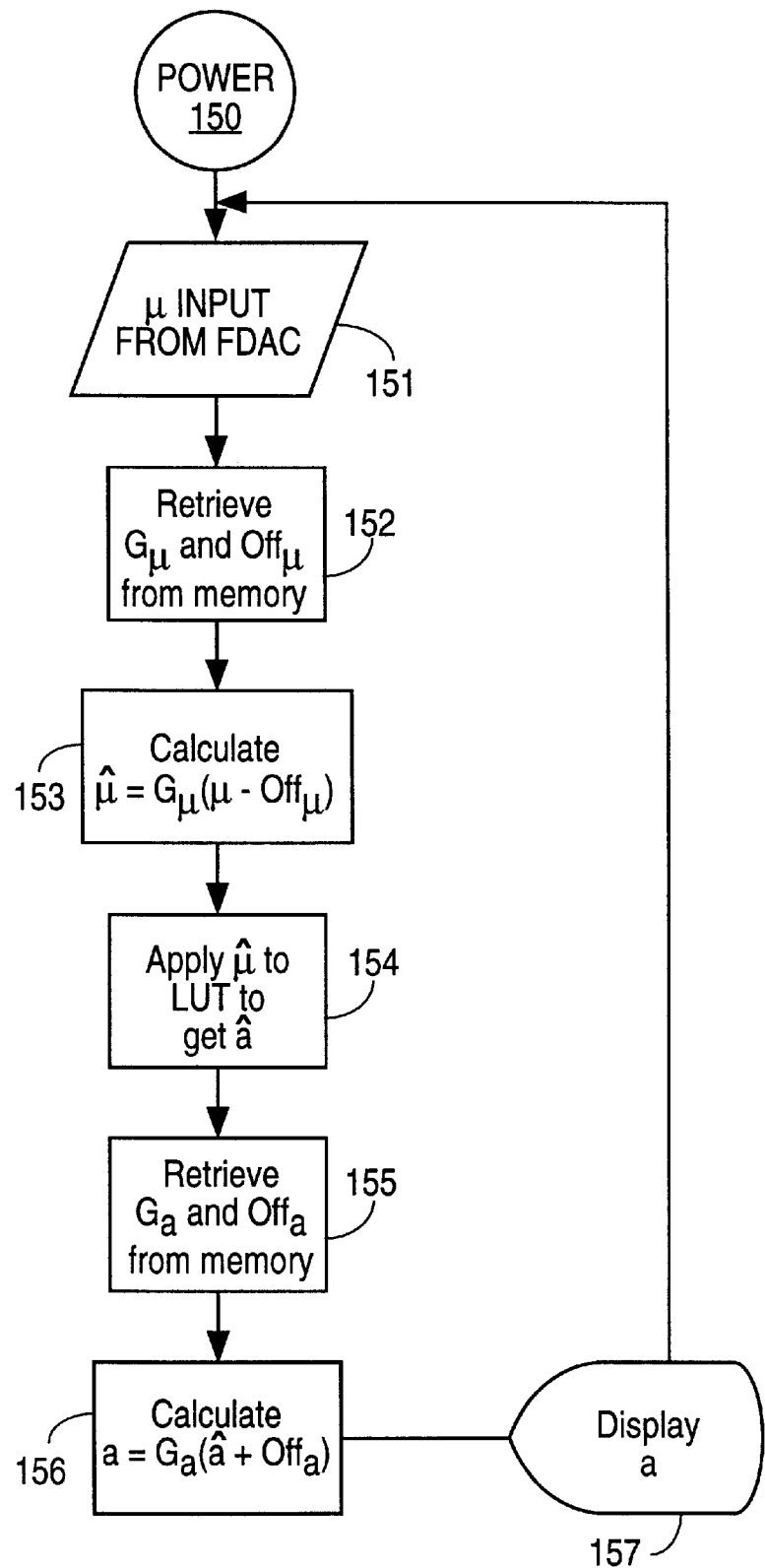
FIG. 5 is a process-flow diagram of a computer program that receives as input true DAC angle data u (depicted as line 100 in FIG. 3) and octant data OCT, and provides in response a signal corresponding to the appropriate true angle a to numeric display 26.

FIG. 5 is a process-flow diagram of a computer program that receives as input true DAC angle data u (depicted as line 100 in FIG. 3) and octant data OCT, and provides in response a signal corresponding to the appropriate true angle a to numeric display 26. In one embodiment the process flow is implemented on microcontroller 50. It is to be understood that one of ordinary skill in the art could translate the functionality of FIG. 5 into a microcontroller computer program using conventional techniques. Beginning at step 150, after power is applied (i.e., when level 27 is switched on) level 27 becomes active after a period of time sufficient for voltages within microcontroller 50 to stabilize. Microcontroller 50 then begins receiving data u indicative of the DAC steps associated with FDAC 38 (step 151) and data OCT from decoder 36 indicative of the octant from which the data u originated.

In step 152, microcontroller 50 retrieves from memory the gain $G_u$ and the offset $Off_u$ corresponding to the octant indicated by bus OCT. For example, if bus OCT indicates that the DAC data u was located in octant V, then microcontroller 50 retrieves gain $G_{uv}$ and offset $Off_{uv}$ derived above, both of which correspond to octant V. The gain and offset data $G_u$ and $Off_u$ are then used in conjunction with DAC data u to calculate the normalized DAC value û for the appropriate octant (step 153). While the normalize DAC value û is expressed as ranging from zero to one, the value û may range between different values. For example, in an embodiment in which the resolution of level 27 is 0.5°, the value û ranges from zero to ninety, the number required to represent half degrees over a range of 45°.

During calibration of level 27, microcontroller 50 is programmed to include a LUT that receives the normalized DAC data û and outputs normalized angle data â. During step 154, the normalized DAC data û is applied to the LUT, which provides in response the corresponding normalized angle data â. Microcontroller 50 than retrieves the respective gain and offset values Ga and OFFa from memory (step 155) and uses them to calculate the true angle a for the appropriate octant, e.g. equation [4] for octant V (step 156). Finally, the true angle a is routed to display 10 (step 157) and microcontroller 50 returns to step 151.

While the normalized angle data â is expressed as ranging from zero to one, angle data â may, like normalized DAC value û, range between different values. For example, in the embodiment in which the normalized DAC values û range from zero to ninety, so too does the value of angle data â range from zero to ninety. Thus, each normalized DAC value û provided to the LUT has a corresponding value of angle data â.

Figure 6:
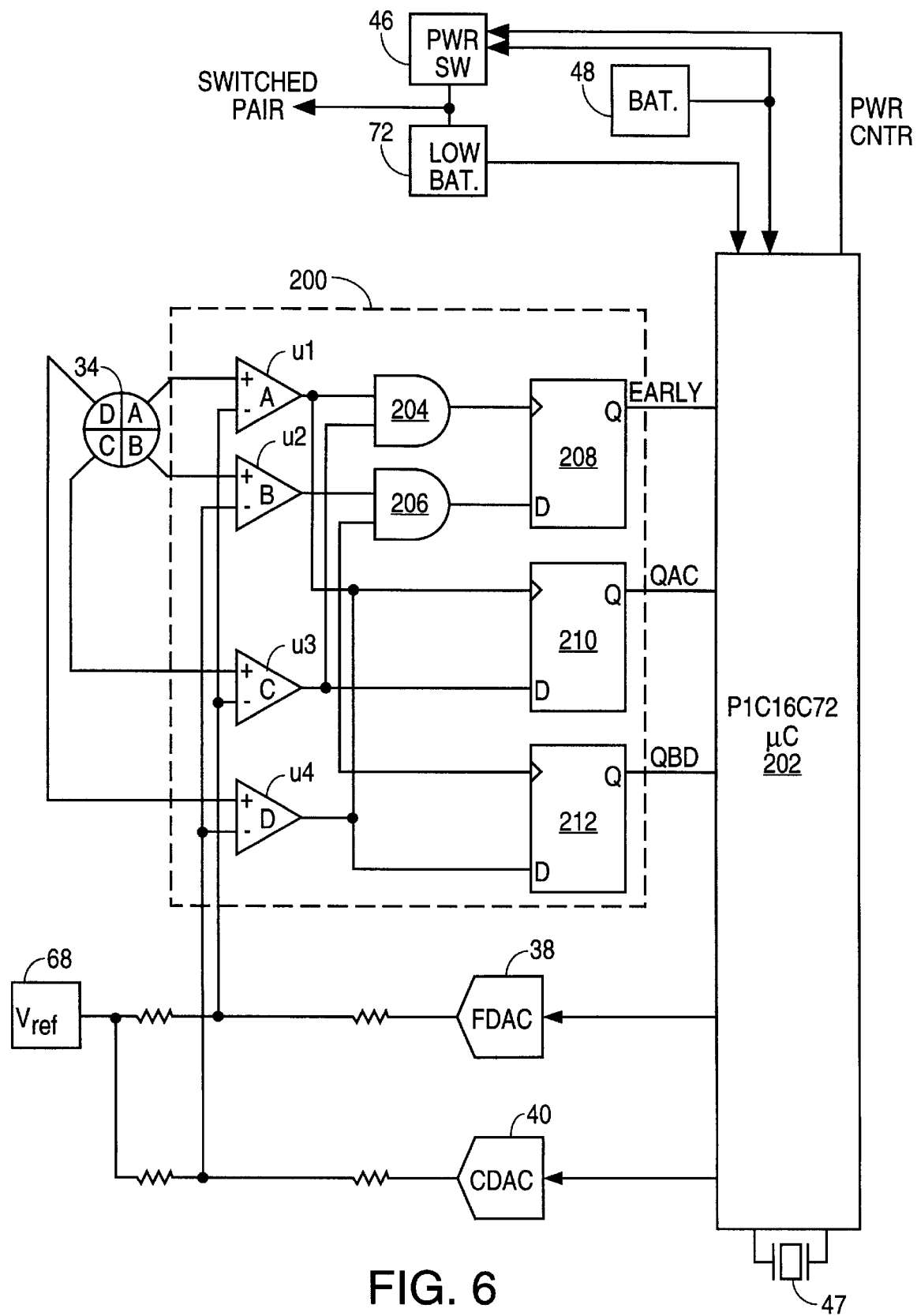
FIG. 6 is a schematic diagram of an embodiment of the invention in which much of the functionality provided by the circuits of FIGS. 2A and 2B is performed by a single PIC16C72 microcontroller available from Microchip Corporation of Chandler, Ariz.

FIG. 6 is a schematic diagram of an embodiment of the invention in which much of the functionality provided by the circuits of FIGS. 2A and 2B is performed by a single PIC16C72 microcontroller available from Microchip Corporation of Chandler, Ariz. Like the circuit of FIG. 2, the circuit of FIG. 6 includes power switch 46, low-battery-detection circuit 72, battery 48 and reference voltage 68. Microcontroller 202 is connected directly to battery 48; power switch 46 provides switched power to the remaining circuitry. The circuit of FIG. 6 additionally includes a crystal 47, or other oscillator resonating element, connected to microcontroller 202.

Input circuitry 200 includes comparators U1, U2, U3, U4 as depicted in FIG. 2A; however, the input terminals to comparators U1, U2, U3, U4 are reversed. Input circuitry 200 also includes a pair of AND gates 204 and 206 and three positive-edge-triggered flip-flops 208, 210, and 212. Input circuitry 200 provides the above-described octal decoding functions of the circuit of FIGS. 2A and 2B when using a PIC16C72 because that particular microcontroller does not have the capability of providing AND gates or flip-flops with access to both clock and input terminals.

Although the present invention has been described in considerable detail with reference to certain preferred versions thereof, other versions are possible. Therefore, the spirit and scope of the appended claims are not limited to the description of the preferred versions contained herein.

We claim:

1. An inclination measuring device comprising:
a sensor determining an inclination of the device relative to a null inclination;
a housing in which the sensor is mounted, the housing defining a longitudinal axis; and
a visual display on the housing operatively connected to the sensor and displaying an inclination of the device, the visual display including:
a numeric display providing numeric inclination measurements over a range of 0° to 360° and having a first resolution; and
a graphic display providing graphic inclination measurements at least at cardinal angles of inclination and having a second resolution greater than the first resolution, wherein the numeric display and graphic display are simultaneously active.

2. The device of claim 1, wherein the graphic display provides graphic inclination measurements at arbitrary angles of inclination.

* * * * *